United States Patent
Lessard et al.

(10) Patent No.: US 6,910,253 B2
(45) Date of Patent: Jun. 28, 2005

(54) METHOD OF CONSTRUCTION OF AN INSULATING AIR CONDUIT

(76) Inventors: Marc Lessard, 186, Boischatel Street, Chicoutimi, Québec (CA), G7G 4M5; Mona Tremblay, 186, Boischatel Street, Chicoutimi, Québec (CA), G7G 4M5

( * ) Notice: Subject to any disclaimer, the term of this patent is extended or adjusted under 35 U.S.C. 154(b) by 0 days.

(21) Appl. No.: 10/387,128

(22) Filed: Mar. 13, 2003

(65) Prior Publication Data

US 2004/0069362 A1 Apr. 15, 2004

Related U.S. Application Data

(63) Continuation of application No. 09/817,279, filed on Mar. 27, 2001, now abandoned, and a continuation of application No. 08/547,131, filed on Oct. 24, 1995, now Pat. No. 6,230,750.

(30) Foreign Application Priority Data

Feb. 14, 1995 (CA) .............................................. 2142190

(51) Int. Cl.⁷ ............................................... B21D 39/00
(52) U.S. Cl. ......................... 29/455.1; 29/890.05; 29/3
(58) Field of Search ........................ 29/890.14, 889.21, 29/889.22, 889.5, 455.1, 890.053, 33 T; 137/148, 149, 151, 155, 158, 169, DIG. 4

(56) References Cited

U.S. PATENT DOCUMENTS

| | | | | |
|---|---|---|---|---|
| 3,251,382 A | * | 5/1966 | Tatsch ......................... | 138/151 |
| 5,310,594 A | * | 5/1994 | Holland et al. .............. | 428/167 |
| 6,230,750 B1 | * | 5/2001 | Lessard et al. ............. | 138/149 |

* cited by examiner

Primary Examiner—Eric Compton
(74) Attorney, Agent, or Firm—Ogilvy Renault

(57) ABSTRACT

This invention is related to ultra-light conduit for used air and a method for construction of such a conduit with sandwich sheet type of material such as "THERMO-FOIL™" permitting to avoid losses of heat and humid air. The method of construction of a used air rectangular conduit includes the following five (5) steps: 1) cutting of a sandwich sheet 2) sealing around the sandwich sheet 3) heat formation of lengthwise channels on the surface of sandwich sheet 4) assembling the sandwich sheet into a conduit of a predetermined length and 5) installing a lengthwise vertical reinforcement into the conduit and providing a male adaptor to a fore end of the conduit which could be adapted to an aft end of a joining conduit.

11 Claims, 7 Drawing Sheets

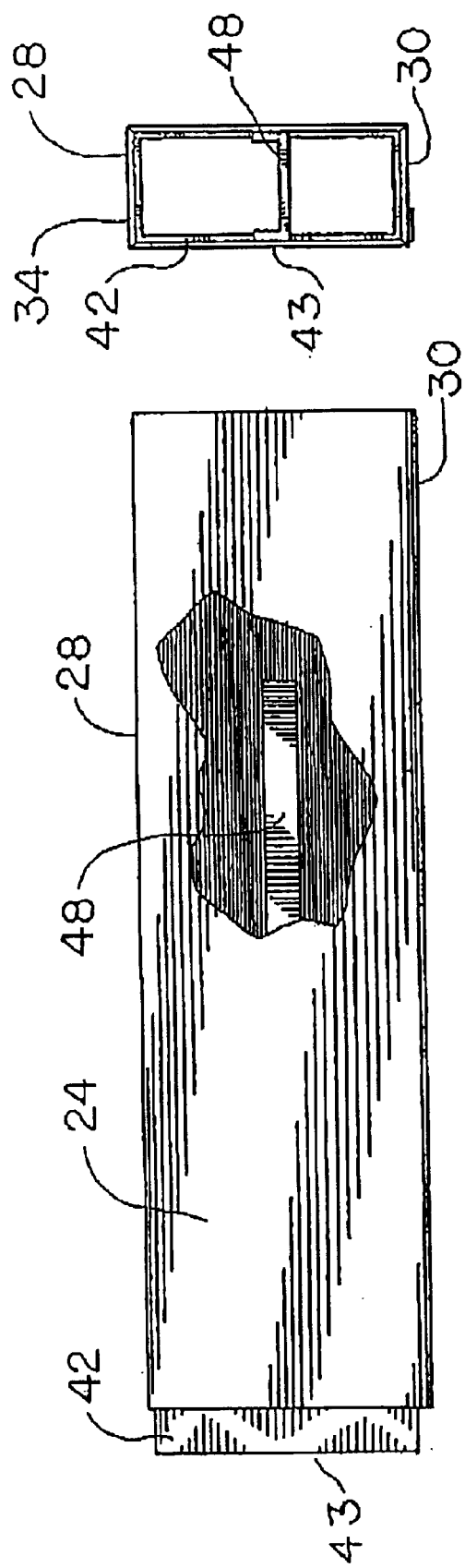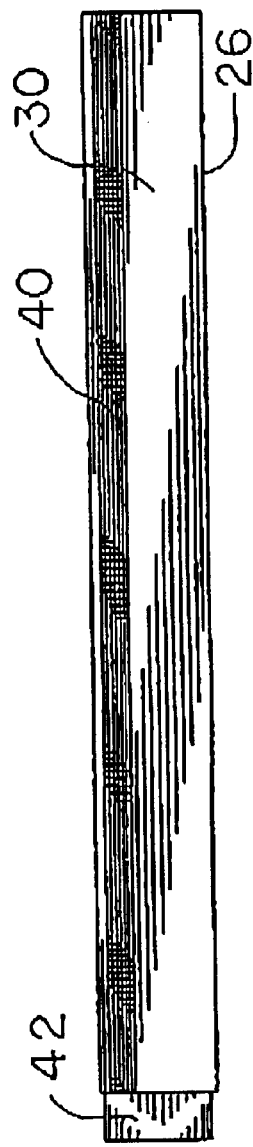
FIG. 2A
FIG. 2B
FIG. 2C

METHOD OF CONSTRUCTION OF AN INSULATING AIR CONDUIT

RELATED APPLICATION

This application is a continuation of U.S. patent application Ser. No. 09/817,279 filed Mar. 27, 2001, now abandoned, which is a continuation of U.S. patent application Ser. No. 08/547,131 filed on Oct. 24, 1995, now U.S. Pat. No. 6,230,750.

FIELD OF INVENTION

This invention belongs to the field of exhausting used air from houses, apartments and commercial buildings and particularly from kitchen hoods, bathroom fans and dryer conduits.

This invention is related to a new method of construction of used air conduits that have a circular or a rectangular cross section and made of a sandwich of reflective double wall air bubble cushioned material, such as "THERMO-FOIL™" to prevent losses of heat and humid air.

The method of construction comprises five steps of transformation of a sandwich sheet, for a rectangular conduit or for a conduit with a circular section. For a conduit with a rectangular section 1) cutting of a sandwich sheet, 2) sealing the periphery of the sandwich sheet 3) creating a heat formed channel installed lengthwise to deliminate four sides of a segment 4) assembling the mating ends of a sheet and 5) installing a male adaptor in one end of a segment for joining another end of a second segment.

Another method of construction is provided for used air conduits with circular section by: 1) cutting a sandwich sheet 2) sealing around the sandwich sheet 3) passing through a bender to form a circular section 4) assembling the mating ends of a sheet and 5) putting a male adaptor to join another conduit.

PRIOR ART

A review of prior art revealed some patents relating to conduits comprising insulating material, sheet type or foam type.

The following patents held my attention.

CN 2,049,198 Lutgen, 22 Aug. 1991, describes an insulator of the sandwich type conceived to exactly fit the internal shape of cryogenic containers. The sandwich includes successive layers of thermal insulating materials such as polystyrene and foams of different densities. To prevent liquid or gas exchanges, sheets must be enclosed in impermeable and rigid walls such as the steel walls of a cryogenic reservoir: this increases considerably the construction costs.

CN 2,032,111 Cur et Al., 19 Jun. 1991, describes an insulator of the sandwich sheet type conceived to be stuck onto a flat face of a refrigeration unit. The sandwich, sealed at its ends, includes superposed lamellae made of different insulating materials and thin inter-lamellar spaces filled with air. The insulating sandwich of Cur et Al. is held by a wall of plastic and a wall of metal, this increasing considerably construction costs. Moreover, Cur et Al. do not show joints between sheets that would indicate how those could form independent structures without the existence of plastic and metal walls. Also Cur et Al. do not use air bubbles as a thermic insulation, U.S. Pat. No. 5,014,753 Rossignol et Al., 14 May 1991, describes a flexible and impermeable insulator to protect electrical wires against radiant heating. The insulator comprises a series of successive layers of polymers of which a first layer is of dark particles and a second clear with particles of metal having a reflecting surface. Rossignol et Al. do not use air bubbles as thermic insulation, nor the principle of hermetic joint around an empty structure.

U.S. Pat. No. 3,810,491 Hildebrandt, 14 May 1974, describes a method of manufacturing insulating conduits of double-walling and circular section. Conduits of double walling comprise an interior pipe disposed in a coaxial way relatively to an exterior pipe and are insulated in the space comprised between double-walling. Insulators being constituted of many successive layers of insulating materials are separated by air spacing. These are obtained with an insulating method placing insulation in tension rather than compression. The insulating method consists in laying out insulating bands and spacers in a helicoidal way along the wall of the internal pipe and to remove the spacers to create a tension between the wall of the internal pipe and the wall of the external pipe. This invention requires two conduits with rigid walls. Its use seems less appropriate for bends or other brutal directional changes or for conduits of rectangular section.

U.S. Pat. No. 3,397,720 Jones, 20 Aug. 1968, reveals an insulation system for cryogenic structures made of a sandwich sheet that has many successive layers of insulation material, such as sheets of corrugated polyester and other layers of insulation material. Sheets of corrugated polyester create space at the center leaving room for air. This application requires a double-walling pipe to avoid air losses through insulating sheets that seem porous. Moreover, this type of corrugated material, in the construction of sandwich sheets does not make them flexible enough for directional changes such as bends.

Conventional used air conduits made for kitchen hoods are built with galvanized steel and do not comprise any insulation to prevent heat loss. This type of conduits is available on the market in two L-shaped half-conduits to be joined to make a rectangular conduit. The two parts are held together with ends that are not air tight and the conduits do not comprise any adaptor to hold the ends of conduits together, facilitating loss of humid air. This type of conduit does not comprise any thermic insulator, thus favoring humid air condensation in a conduit which passes through a cold area of a building or in winter time. So, as the conduit is not tight to fluid exchanges, humidity and condensing water may leak into the structure of the building and bring nuisances such as moisture or other problems needing repairs or replacement.

None of the inventions mentioned above has a combination of a light material, not requiring rigid nor expensive walls, but on which the joints and the perimeter are air-tight, to prevent losses of warm and humid air.

OBJECTIVES

The first objective of this invention consists in building vaportight used air conduits to prevent humid air losses in buildings, a thermic insulator to avoid humid air condensation within conduits, adaptors and means of joining such conduits.

An objective of this invention is to provide a combination comprising a basic material with two external layers of a radiant material, separated by at least two layers of air bubbles comprised in between five films of plastic matter (as polyethylene), cut in variable sizes, prefolded in desired shape and assembled by means of adhesive bands and provided with rigid means of coupling at one end of a conduit and at the center of a four foot long straight conduit.

Another object of this invention is to create ventilation conduits that are light, easy to install and at a lower cost than uninsulated conduits requiring the addition of an insulator available in present market.

Another objective is to make four foot long conduits that permit union with multiangular bends or internal deflectors.

The last objective is to make used air conduits of rectangular shape (10 inches×3¼ inches) for kitchen hoods, used air conduits of circular shape for bathroom (generally 3 inches) and drying machine conduits (usually 4 inches).

DRAWING FIGURE

I will describe hereinafter more precisely, a method of construction consistent with the present invention by referring to annexed drawings in which:

FIG. 2A is a plan view of the conduit of FIG. 1

FIG. 2B is a side view of the conduit of FIG. 1

Figure 1:
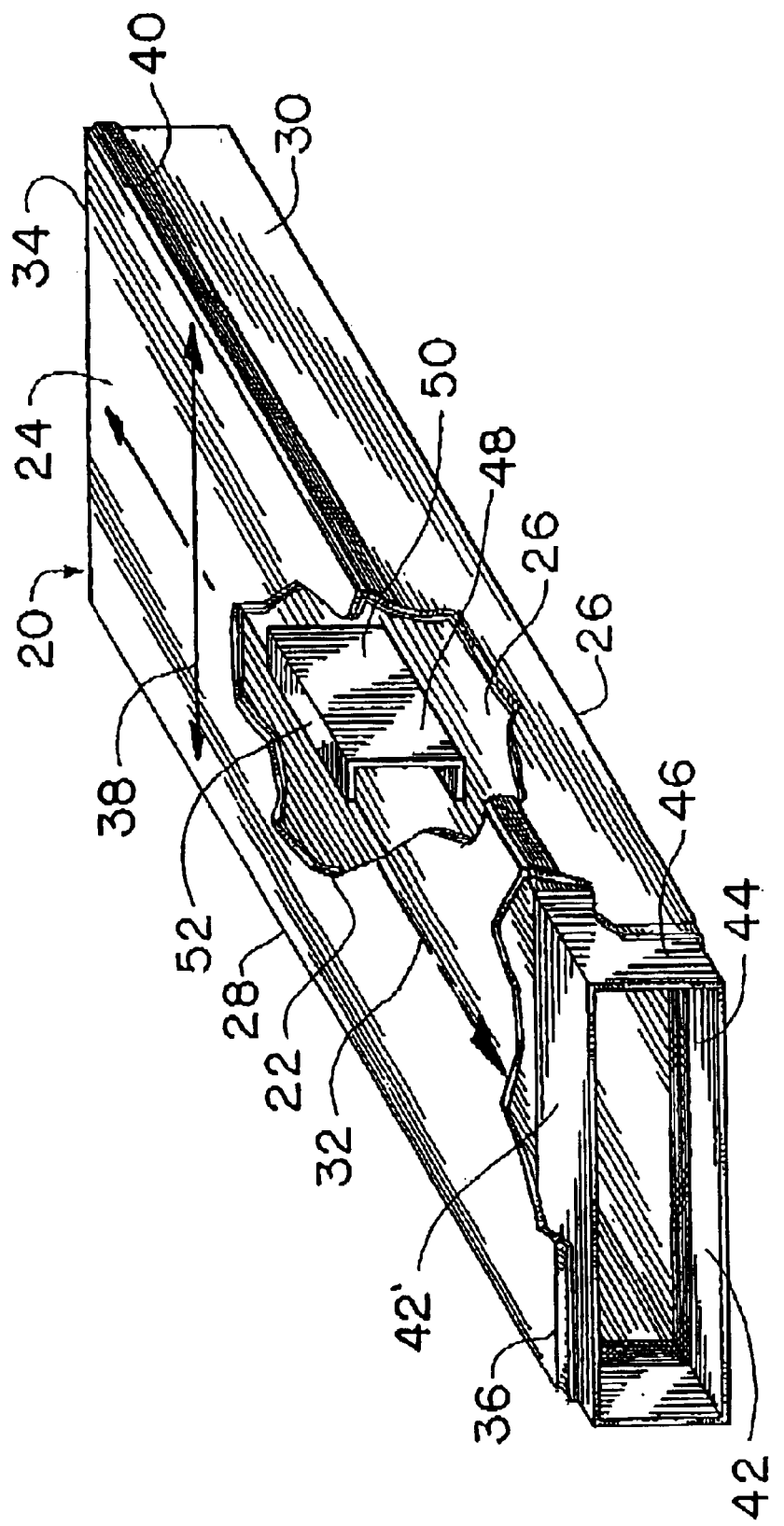
FIG. 1 is a perspective view of a used air conduct, rectangular, with partial section.
Figure 3A:
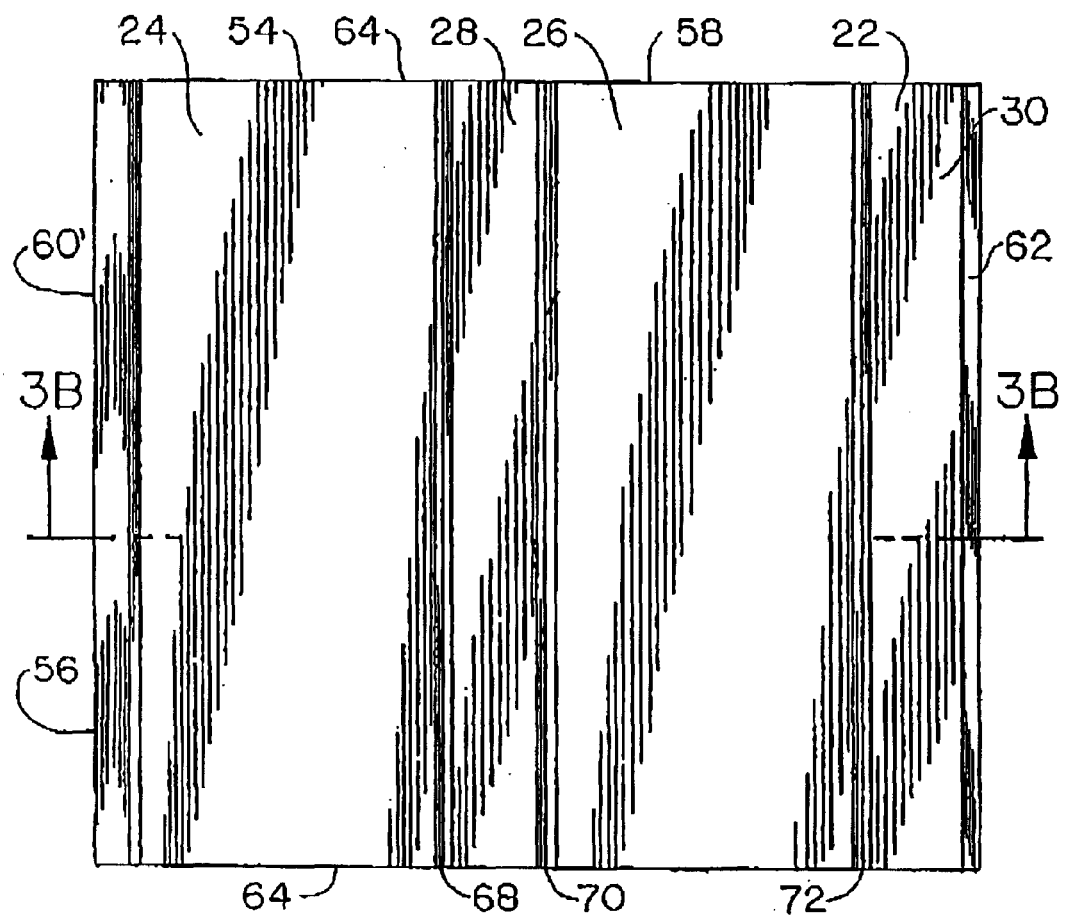
Figure 3B:
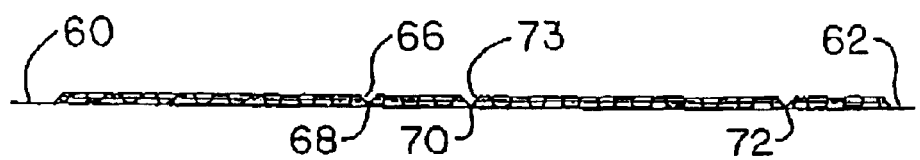
Figure 3C:
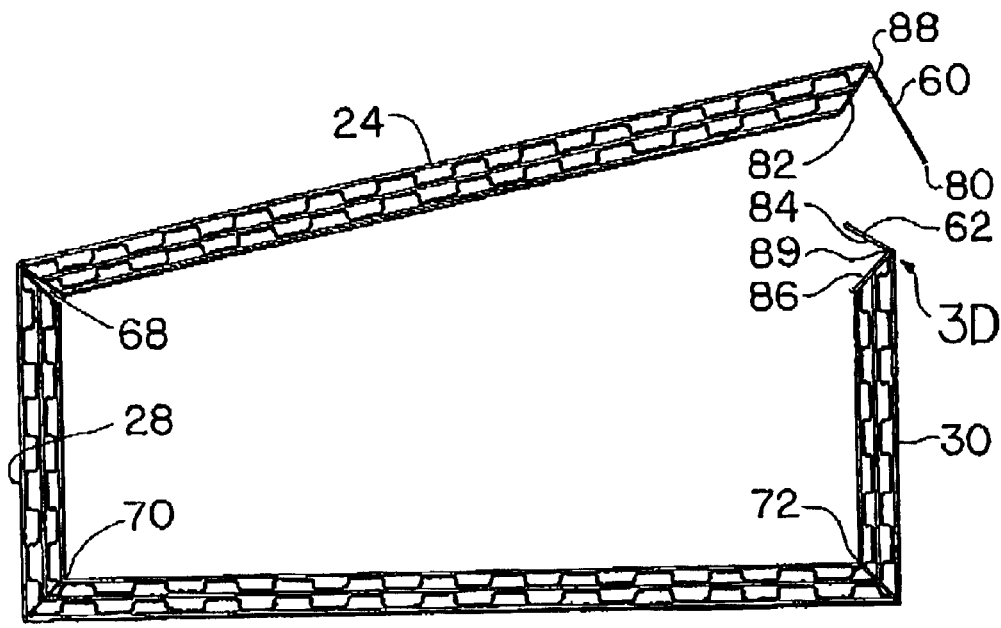
Figure 3D:
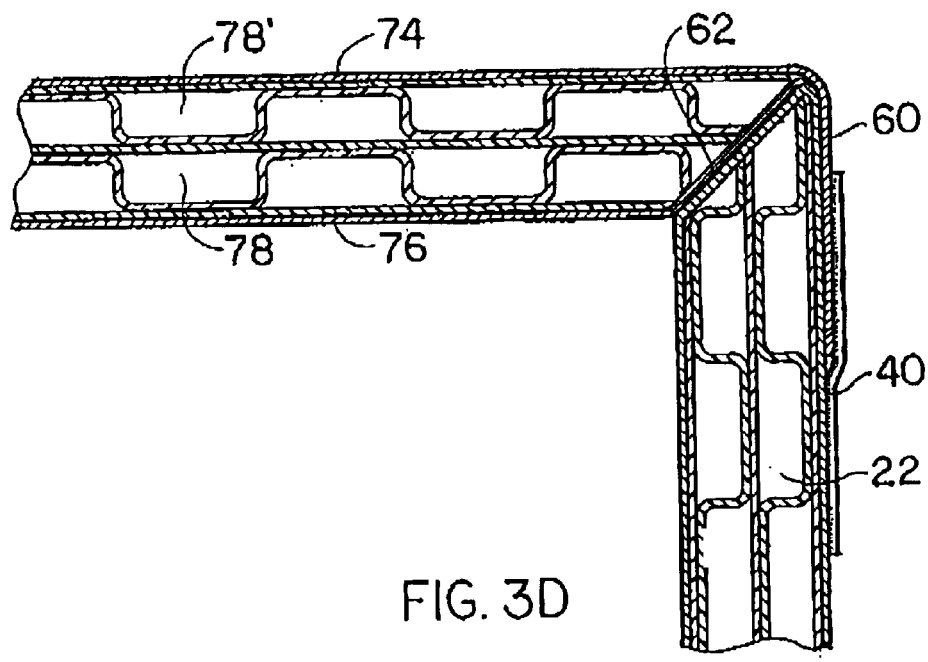
Figure 4B:
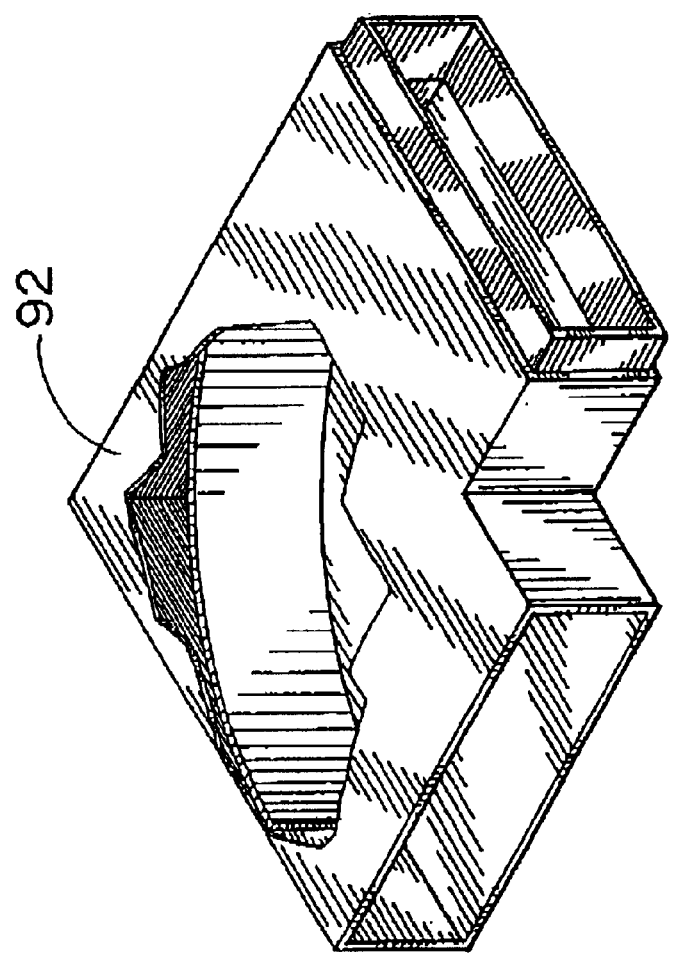
Figure 4A:
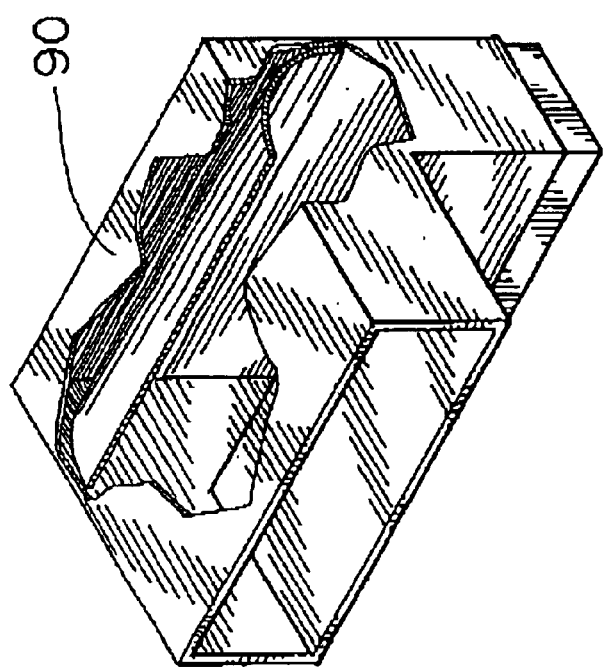
Figure 5:
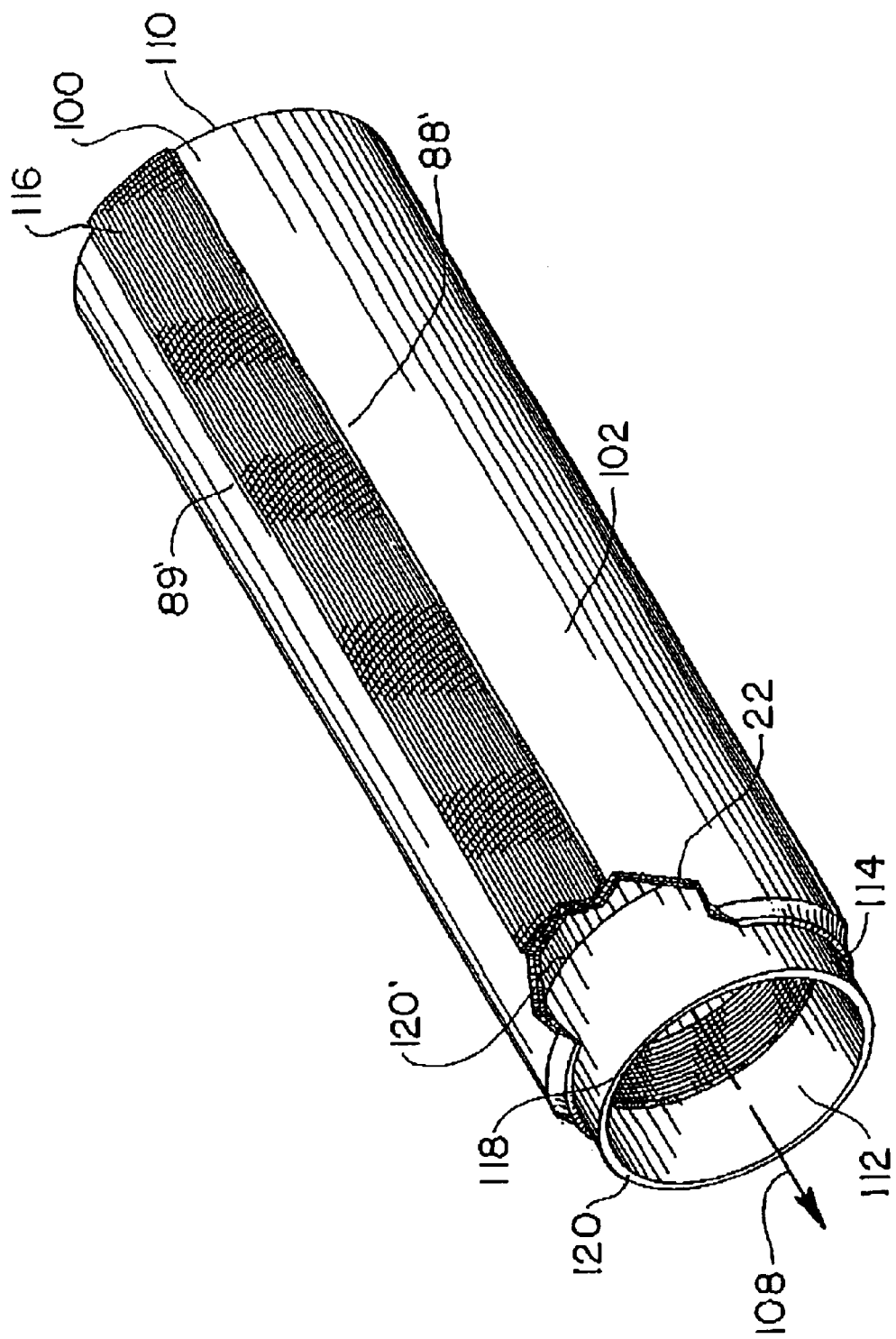
Figure 6A:
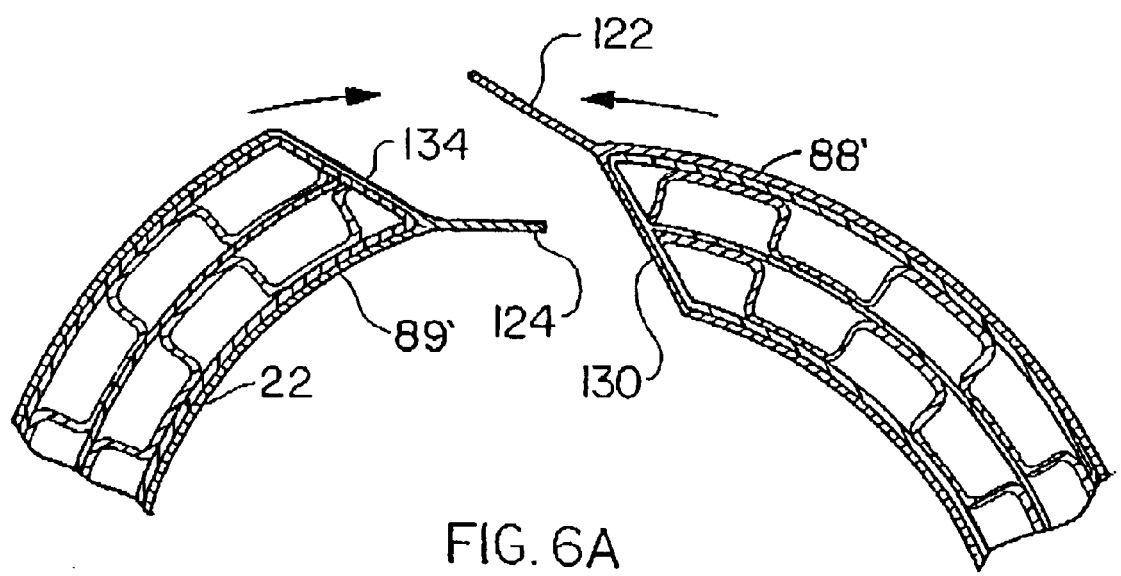
Figure 6B:
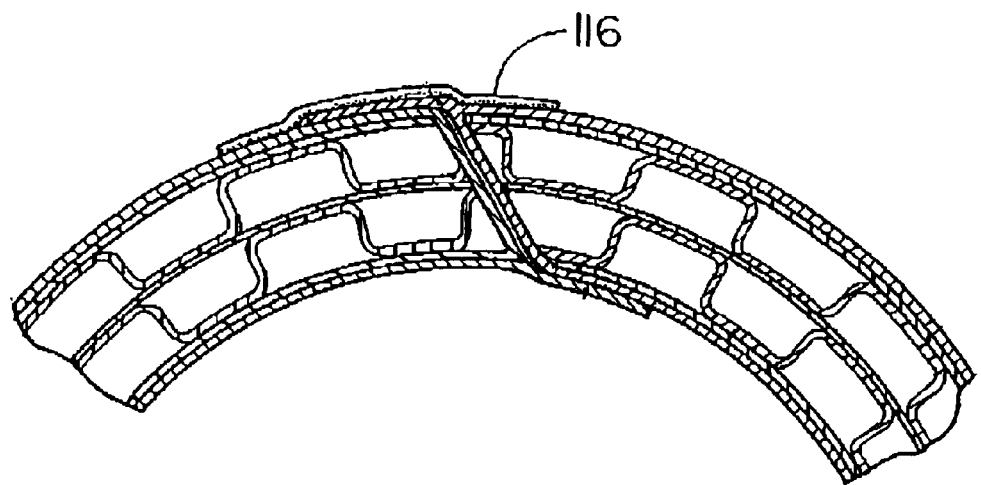

FIG. 2C is a view from the upstream end of the conduit of FIG. 1 FIG. 3A is a top view of a conduit, in construction FIG. 3B is a section according to line 3B—3B of FIG. 3A FIG. 3C is a section according to line 3C—3C of FIG. 3A, in assembly FIG. 3D is a close-up view of region 3D of FIG. 3C in closed position FIG. 4A is a perspective view with a partial cut of a bend FIG. 4B is a perspective view with a partial cut of another bend FIG. 5 is a perspective view of a circular conduit with a partial section FIG. 6A is a partial section of a longitudinal junction of a circular conduit in preparation FIG. 6B is a partial section of the longitudinal joint of FIG. 6A completed.

DESCRIPTION OF THE INVENTION

A preferred embodiment of the subject invention is illustrated in FIG. 1 wherein like parts refer to like numbers and which shows:
Air Duct, Rectangular A rectangular air duct 20 particularly for evacuating used air has a parallelepiped shape and is made of a sandwich sheet 22. The air duct 20 comprises a top 24, a bottom 26, a closed side 28 and an opened side 30 all forming a rectangular shape, parallel to the major axis 32 and in the direction of fluid flow, The air duct 20 also comprises opened upstream 34 and downstream 36 ends, it is also of rectangular shape and is parallel to a minor axis 38 and perpendicular to the fluid flow. The top 24 is joined to the closed side 28 with an adhesive band 40 on all the length of the top 24 and of the opened side 30.

A rectangular adaptor 42 comprises two longer sides 44 and two shorter sides 46; the rectangular adaptor 42 partly fits into downstream end 36 to serve as male end to another air duct on which the upstream end 34 serves as the female end.

An elongated C-reinforcement 48 comprises a web 50 and two wings 52. Each wing 52 of the C reinforcement is respectively in contact with the top 24 and the bottom 26, the web 50 serving as support, the C-reinforcement 48 being near the center of the major axis 32 and of the minor axis 38

The C-reinforcement 48 prevents the collapse of the top 24 onto the bottom 26.

FIG. 2A illustrates a view of the top 24 and of the rectangular adaptor 42. FIG. 2B is a view of the opened side 30, of the adhesive band 40 and of the rectangular adaptor 42. FIG. 2C illustrates a view of the upstream end 34, the rectangular adaptor 42 and the C-reinforcement 48.

FIGS. 3A, 3B and 3C illustrate different steps of the construction of an air duct 20, 4 foot long, 3¼ foot tall, 10 inch wide. FIG. 3A shows the result of the first step of construction, namely cutting the sandwich sheet 22 in such a way that it has a rectangular shape with a perimeter 54 comprising two sheet long sides 56 of 4 foot in length and two sheet short sides 58 of 30 inches.

The second step of construction is that of sealing the perimeter 54 of the sandwich sheet 22 with a heated angle iron to form a first flat end 60 prolonging the opened side 30 and two lateral flat ends 64 prolonging the sheet short sides 58.

The third step of construction is that of creating V grooves 66 with a heated angle iron to form a first limit 68 between the top 24 and the closed side 28, a second limit 70 between the closed side 28 et the bottom 26 and a third limit 72 between the bottom and the opened side 30.

FIG. 3B illustrates a detail of a side view of the sandwich sheet 22, the first flat end 60, the second flat end 62 and the V grooves 66 after the third step. The V grooves 66 have a 45° side 73 to form a isosceles triangle when the sandwich sheet is on a flat surface.

The sandwich sheet 22 (FIG. 3D) is of THERMO-FOIL™ type and comprises an external film 74, an internal film 76, two layers of air cells 78, the first flat end 60 (FIG. 3C) prolonging the top 24 and the second flat end 62 prolonging the opened side 30. The air cells 78 act as insulators while the external film 74 and the internal film 76 act like radiant material to keep a gradient of temperature between ambient air and used air circulating in the air duct. There cannot be any heat loss between an environment with ambient air and an environment with used air because the first flat end 60 and the second flat end 62 seal a perimeter of the sandwich sheet 22.

FIG. 1 illustrates a wall located longitudinally relatively to a major axis parallel to the direction of fluid flow and of which a side is shown on FIG. 3C and presents a rectangular shape comprising a first end 88 extending in a first flat end 60 of a long crushed prolonged surface 80 of a width of 1½ inch, and a first angular crushing 82 at 45° relatively to the top 24.

A second end 89 extends in a second flat end 62 and comprises a second angular crushing 86 at 45° relatively to the opened side 30. The second flat end 62 is crushed on a width of ½ inch and can comprise a small prolongated surface 84 that overhangs the second angular crushing 86, FIG. 30 illustrates the fourth step of construction, namely to assemble the rectangular air duct 20. When the sandwich sheet 22 is folded to form the air duct 20, the first angular crushing 82 and the second angular crushing 86 join to make a corner of the air duct.

The first flat end 60 located at the first end 88 is to be stuck to the outside of the opened side 30 and the second flat end 62 located at a second end 89 is to be stuck on the second crushing end 86 and on the small prolongated surface 84 on bottom 24 to form the air duct 20, FIG. 3D illustrates a detail of the location of the first flat end 60 once assembled and held by the adhesive band 40.

The fifth step is that of fitting the rectangular adaptor 42 into the downstream end 36 and to fix the C-reinforcement 48 (FIG. 1) inside the air duct 20.

FIG. 4A is a perspective view of a vertical bend 90, made for a ventilating network with a vertical change in direction.

FIG. 4B is a perspective view of a horizontal bend 92 designed for a ventilation network with a horizontal change in direction.

Circular Air Duct

FIG. 5 is a perspective view of a circular air duct 100, that has a cylindrical shape and made of a sandwich sheet 22. The circular air duct 100 comprises a cylindrical wall 102 having a first end for circle 88' and a second end for circle 89' which are parallel to a major axis of circle 108, an upstream and a downstream ends of circle 110 and 112, opened and with circular sections, and a circular adaptor 114.

The first end for circle 88' is joined to the second end for circle 89' with an adhesive band for circle 116 on all the length of the circular duct 100, The circular adaptor 114 is rigid, of cylindrical shape and comprises two ends 120; the two ends 120 being opened and comprising a circular section. The radius of the circular adaptor 114 is shorter than the radius of the circular section by an amount equal to the width of the sandwich sheet 22. The circular adaptor 114 partially fits in the inside of the downstream end of circle 112 to serve as a male to a following air duct of which the upstream end of circle 110 is used as a female.

To construct the circular duct 100, having a length of 4 feet and a diameter of 3 or 4 inches, there are four steps equivalent to those needed to construct the air duct 20 with rectangular section. A first step consists in cutting the sheet 22 into a rectangular shape having a perimeter 54 (FIG. 3A) and two sheet long sides 56 of four feet and two sheet short sides 58 of 9½ or 12½ inches.

A second step of construction consists in sealing the perimeter 54 of the sandwich sheet 22 with a heated angle iron to form a first flat end for circle 122 (FIG. 6A) prolonging the first end for circle 88', a second flat end for circle 124 prolonging the second end for circle 89' and two lateral flat ends for circle 126 prolonging the sheet short sides 58.

FIG. 6A shows a detail of the first end for circle 88' that comprises a first flat end 122 that comprises a ½ inch wide prolongated external crushing and an angular side 130 angular relatively to the cylindrical wall 102.

The second side 124 prolongs itself towards the interior, over a width of ½ inch, and has a 135° side 134.

A third step of construction is that of assembling the circular duct 100. The first flat end 122 is to be stuck outside of the second end 89 and the second flat end 124 is to be stuck under the first end 88 to form a continuous circular duct 100.

FIG. 6B illustrates the location of the first and second flat ends 122 and 124 with external and internal prolongations once assembled and enforced with an adhesive band 116.

A fourth step of construction is to put the sheet for the circular duct 100 through a bender to get a perfectly cylindrical product. This step is optional.

A fifth step of construction is that of fitting the circular adaptor 114 into the downstream end 112.

I have discovered that the condensation problem caused by heat loss in used air conduit is resolved by using a sandwich sheet such as THERMO-FOIL™ with thermic insulation properties superior to those of foams or sandwiches made of lamellae of different insulating materials. I have also discovered that the problem of humid air loss caused by used air conduits that are not air-tight is resolved by sealing the perimeter at each joint by material of the sandwich sheet and in using an adaptor located judiciously in a used air system.

The reflective sandwich sheet material is made of a sandwich comprising two layers of air cells and serving as thermic insulator and on which is superimposed on top and bottom a sheet of impermeable and radiant material.

So the sandwich sheet may successively comprise an aluminum sheet, two layers of air bubbles contained within three films of a plastic sheet coated with a material that might be fireproof, and another aluminum sheet; or comprise an external aluminum sheet, a layer of air cells and an internal polyethylene sheet; or it might also be constructed with an external polyethylene sheet, a layer of air cells and an internal polyethylene sheet.

SUMMARY OF INVENTION

A general objective is to create an air duct comprising a number of segments, each one longitudinally oriented relatively to a major axis 32 parallel to the direction of used air flow and comprising a wall delimiting an interior space which permits air flow, the wall being of uniform thickness and made of a rectangular sandwich sheet comprising air cells confined between a first external film and a second internal film, the second internal film coinciding with the wrapping of the internal space, each segment comprising an opened downstream end 36 and an upstream end 34, and means for coupling fitted into the downstream end 36 to become the male end when joined with another segment, or to couple an used air conduit to a female end of another type of conduit, the upstream end being the female end receiving the above male end.

The sheet may comprise: a first end 88 coinciding with the length of the rectangular sheet to form the longitudinal joint of the segment with a corresponding second end 89, the first end terminating by a first 45° angular crushing 82 extended in a first flat end 60 and a second end 89 ending with a second angular 45° crushing 86 extended into a second flat end 62 that folds up onto the second angular 45° crushing 86, the first 45° angular crushing 82 leaning on the second flat end 62, the first flat end edge 60 settling onto the second end along the first external film. The wall comprises means of adhesion to seal and hold together the first and second ends.

The coupling means comprise an adaptor 42 with an external face 43 adjacent to the second internal film 76 of the wall, partly extended outside of the downstream end 36 of the segment and that can be sled in the upstream end of an adjacent segment or series of segments. The wall also comprises lateral flat ends to seal sandwich material at upstream and downstream ends.

The wall may also form a parallelepiped that has a rectangular section comprising a top 24 extended in the first flat end 60, a closed side 28, a bottom 26, an opened side 30 extended by the second flat end 62 and at least three longitudinal folding lines of which one demarcating a first limit 68, between the top 24 and the closed side 28, another demarcating a second limit 70 between the closed side 28 and the bottom and a third one demarcating a third limit, between the bottom and the opened side, the parallelepiped comprising means of reinforcement orientated along the major axis, in contact with top and bottom, to prevent collapsing of the top onto the bottom.

The rigid adaptor may be of parallelepiped shape and comprises two opened ends and a rectangular piece of length l and width w both inferior by twice the thickness t of the wall, relative to the length L and width W of the rectangular section of the segment, according to the equations L=2t+l and W=2t+w. The adaptor will lean against the internal side of an opening delimited by the top, the closed side, the bottom and the opened side of the segment.

Means of reinforcement is a C shaped reinforcement comprising a web and two wings, each one respectfully touching top and bottom. The wings of the C are placed parallel to the major axis and the web serves as support.

The first flat end is joined to the end of the opened side by means of adhesion located on the entire length of the opened side. Means of adhesion of the air duct is an aluminum band of the Mactac™ type located over the entire length of the wall, to join the first flat end to the second one.

The wall may be cylindrical, in which case it comprises a first and second ends, the upstream and downstream ends being a circular section of radius R, means of coupling being a rigid adaptor comprising a cylindrical wall and two opened ends of radius r inferior by the amount of the thickness of the cylindrical wall, relatively to the radius of upstream and downstream ends, namely R=r+t.

Method of Construction

The air duct may be made with rigid insulation material and involves the following steps:

a step of cutting the sandwich of insulating material delimiting a perimeter of predetermined size.

a step of sealing the perimeter to prevent fluid exchanges, gaseous or liquid, between the interior of the insulating material and the surroundings, the sealing step comprising a step of crushing the first and the second ends, a step of folding the sandwich around the major axis according to a desired shape, a step of assembling of the first and second flat ends by means of adhesives to complete the shape of the section, a step of installing of a rigid adaptor fitted into the downstream end.

If the air duct is of parallelepiped form with a rectangular section comprising a top, a bottom, a closed and an opened sides, the method comprises these additional steps of construction:

a step of folding by heating means the sandwich to obtain the angles, top, bottom, closed and opened sides required to have a rectangular air duct, a step of preparation of a C-reinforcement in making a web and two wings with the insulating material, a step of installation of the C wings respectively in contact with top and bottom, the web serving as reinforcement.

The sandwich may be a sheet comprising many layers of material, four sides and a perimeter. The sealing steps of the perimeter consists in heating the perimeter with an angled-iron in such a way that the layers of the sandwich that form the insulation material melt to make four thin bands on each of the four sides of the sheet, of which two are respectively part of the first flat end of top and the second flat end of the opened side, the first flat end when installed, should be in front of the second flat end of the folded sheet.

The width of the first flat end of the top is bigger than the width of the second flat end of the opened side so as to reinforce any joint between the top and the opened side, the first flat end of the top is installed, against the outside face of the opened side, the second flat end of the opened side being placed under the bottom face of the top side.

The step of folding the sandwich consists in heating the sandwich with an angle iron so it will produce three V grooves within the wall of the sandwich. The V grooves having 135° sides form an isosceles triangle when the sandwich is flat on the ground: the V grooves respectively define a first limit between top and closed side, a second limit between closed side and bottom and a third one between bottom and opened side. When the sandwich is folded to built the rectangular air duct, the 135° sides are connecting, to create angles forming the rectangular air duct.

A further assembling step consists in sticking the first flat end of the top against the outside of the opened side, with an adhesive band on all the length of the first flat end. Means of adhesives may be an aluminized adhesive band of the Mactac™ type installed on the full length of a joint, between the first and second flat end.

The sealing step of the perimeter of the insulating material consists in heating the perimeter with a hot angle iron in such a way that the layers of the sandwich that form the insulation material melt to create a thin band and a 135° side, the first flat end with the 135° side 134 being set inside the cylindrical wall, the second flat end with the 135° angled side being set outside the cylindrical wall.

The folding step requires an additional step of circulating the air duct with the assistance of a roll folding device. The second flat end 124 leans against the interior of the cylindrical wall to obtain a continuous cylindrical wall.

The installation step comprises the jointing of a circular adaptor inside a downstream end, the adaptor being rigid and comprising a cylindrical wall and two ends.

It is clear that the method of realization of the present invention being described above, referring to annexed figures is provided as an indication and not limiting. Modifications and adaptations may be made without parting with the objectives of the present invention.

Other embodiments of the above invention are also possible and not limited to the scope of the following claims:

| PARTS LIST | |
|---|---|
| 20 | air duct |
| 22 | sheet |
| 24 | top |
| 26 | bottom |
| 28 | closed side |
| 30 | opened side |
| 32 | major axis |
| 34 | upstream end |
| 36 | downstream end |
| 38 | minor axis |
| 40 | adhesive band |
| 42 | rectangular adaptor |
| 43 | external face |
| 44 | longer side |
| 46 | shorter side |
| 48 | C reinforcement |
| 50 | web |
| 52 | wing |
| 54 | perimeter |
| 56 | sheet long side |
| 58 | sheet short side |
| 60 | first flat end |
| 62 | second flat end |
| 64 | lateral flat end |
| 66 | V groove |
| 68 | first limit |
| 70 | second limit |
| 72 | third limit |
| 73 | 45° side |
| 74 | external film |
| 76 | internal film |
| 78 | air cell |
| 80 | long prolonged surface |
| 82 | first angular crushing |
| 84 | small prolonged surface |
| 86 | second angular 450 crushing |
| 88 | first end for rectangle |
| $88^1$ | first end for circle |

-continued

PARTS LIST

| | |
|---|---|
| 89 | second end for rectangle |
| 89¹ | second end for circle |
| 90 | vertical bend |
| 92 | horizontal bend |
| 100 | circular duct |
| 102 | cylindrical wall |
| 108 | major axis of circle |
| 110 | upstream end of circle |
| 112 | downstream end of circle |
| 114 | circular adaptor |
| 116 | adhesive band for circle |
| 120 | ends |
| 122 | first flat end for circle |
| 124 | second flat end for circle |
| 126 | lateral flat end for circle |
| 130 | angled side |
| 134 | 135° side |

I claim:

1. A method of construction of an air duct made with rigid insulating material comprising a sandwich made of air cells contained between a first external film and a second internal film, said air duct comprising a wall placed around a major axis parallel to fluid flow direction, said wall comprising a longitudinal union of a first flat end and a second flat end, said air duct comprising opened upstream and downstream ends, said method of construction comprising the following steps of:

cutting said sandwich insulting material demarcating a perimeter of predefined dimension;

sealing said perimeter of said sandwich to prevent liquid or gaseous fluid exchanges between the interior of said insulting material and the exterior, said step of sealing comprising a step of crushing said first flat end and said second flat end;

folding said sandwich around said major axis according to a desired cross-sectional form;

assembling said first flat end and said second flat end with means of adhesion, to compplete said cross-sectional form; and installing a rigid adaptor fitting into said downstream end.

2. A method as defined in claim 1, wherein the duct is a parallelepiped air duct of rectangular section comprising a top, a bottom and opened and closed sides, said method further comprising the steps of:

heat folding said sandwich to obtain said top, said bottom, said closed side and said opened side forming said rectangular air duct;

preparing a C-reinforcement, by shaping a web and two wings from said insulting material; and installing said wings respectively in contact with said top and said bottom, said web serving as reinforcement joining said top to said bottom.

3. A method as defined in claim 1, wherein said sandwich is a sheet comprising several layers of material, four sides, and said perimeter, and wherein said step of sealing said perimeter consists in heating said perimeter with an angle iron in such a way that the layers of said sandwich melt to create four thin bands respectively on each of said four sides of said sheet, two of said thin bands coinciding with said first flat end and said second flat end, said first flat end, when installed, being joined to said second flat end.

4. A method as defined in claim 2, wherein the width of said first flat end is larger than the width of said second flat end to cover completely any joint between said top and said opened side, said first flat end being installed externally to said opened side, and said second flat end of said opened side being placed under said top side.

5. A method as defined in claim 2, wherein said step of folding said sandwich consists in heating said sandwich with and angle iron to produce three V grooves on said internal film of said sandwich, said V grooves having 135° sides to form a section of an isosceles triangular form when said sandwich is placed on a flat surface, said V grooves respectively demarcating a first limit between said top and said closed side, a second limit between said closed side and said bottom and a third limit between said bottom and said opened side; when said sandwich is folded to form said rectangular air duct, said 135° sides join to define corners of said rectangular air duct.

6. A method as defined in claim 2, wherein said step of assembling consists in sticking said first flat end of said top onto said opened said adhesive band all along a length of said first flat end.

7. A method as defined in claim 1, wherein said step of folding comprises an additional step to circularize said air duct sandwich sheet with a folding advice.

8. A method as defined in claim 7, wherein said step of installation comprises the jointing of a circular adaptor in said upsrteam end, said adaptor being rigid and comprising a cylindrical wall and two ends.

9. A method as defined in claim 1, wherein said means for adhesion is an aluminized band of the Mactac™ type located on all length of joining of said first flat end to said second flat end.

10. A method as defined in claim 7, wherein said step of sealing of said perimeter of said insulating material consists of heating said perimeter by pressing a heated angle iron so that the layers of sandwich that form the insulating material melt to create a thin band and a 135° side 134, this band being placed under said cylindrical wall, said second flat end comprising said chamfered 135° side 130 being placed outside of said cylindrical wall.

11. A method as defined in claim 10, wherein said second flat end 124 leans against said interior face of said cylindrical wall to form continuous cylindrical wall.

* * * * *